United States Patent
Sriram et al.

(10) Patent No.: US 9,195,455 B2
(45) Date of Patent: Nov. 24, 2015

(54) REDUCING DOWNTIME WHEN PATCHING MULTIPLE INTER-DEPENDENT SOFTWARE COMPONENTS

(75) Inventors: Vijay Nichinbatl Sriram, Bangalore (IN); Shamik Ganguly, Bangalore (IN); Rohit Sah, New Delhi (IN); Sourav Mukherjee, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1123 days.

(21) Appl. No.: 12/416,151

(22) Filed: Apr. 1, 2009

(65) Prior Publication Data

US 2010/0257517 A1 Oct. 7, 2010

(51) Int. Cl.
*G06F 9/44* (2006.01)
(52) U.S. Cl.
CPC .......................................... *G06F 8/68* (2013.01)
(58) Field of Classification Search
CPC ............. G06F 8/65; G06F 9/455; G06F 8/60
USPC .................. 717/110–113, 168; 340/1.1–16.1; 375/354–376; 713/1–2, 100
See application file for complete search history.

(56) References Cited

U.S. PATENT DOCUMENTS

| | | | |
|---|---|---|---|
| 4,558,413 A * | 12/1985 | Schmidt et al. ............... | 717/170 |
| 5,909,581 A | 6/1999 | Park | |
| 6,009,274 A | 12/1999 | Fletcher et al. | |
| 6,151,643 A | 11/2000 | Cheng et al. | |
| 6,425,126 B1 * | 7/2002 | Branson et al. ............... | 717/168 |
| 6,651,249 B2 | 11/2003 | Waldin et al. | |
| 6,823,445 B2 * | 11/2004 | May et al. ...................... | 712/226 |
| 7,080,371 B1 * | 7/2006 | Arnaiz et al. .................. | 717/170 |
| 7,140,013 B2 | 11/2006 | Te'eni et al. | |
| 7,313,782 B2 * | 12/2007 | Lurie et al. ..................... | 717/104 |
| 7,478,385 B2 * | 1/2009 | Sierer et al. .................... | 717/174 |
| 7,552,431 B2 * | 6/2009 | Napier et al. .................. | 717/169 |
| 7,814,481 B1 * | 10/2010 | Welder et al. .................. | 717/176 |
| 8,589,903 B2 * | 11/2013 | Felts .............................. | 717/169 |
| 2004/0015949 A1 * | 1/2004 | Taylor ............................ | 717/171 |
| 2004/0031029 A1 | 2/2004 | Lee et al. | |
| 2004/0243993 A1 * | 12/2004 | Okonnen et al. .............. | 717/168 |
| 2005/0055350 A1 * | 3/2005 | Werme et al. .................... | 707/10 |

(Continued)

OTHER PUBLICATIONS

"Sanjay Goel; et al.,", "Distribution of Patches Within Vulnerable Systems: A Distributed Model", "http://ieeexplore.ieee.org/iel5/10007/32124/01496000.pdf?isnumber=32124&prod=STD &arnumber=1496000&arnumber=1496000&arSt=+458 &ared=+460&arAuthor=Sanjay+Goel%3B+Damira+Pon", Information Assurance Workshop, 2005. IAW '05. Proceedings from the Sixth Annual IEEE SMC, Dated: Jun. 15-17, 2005, pp. 458-460.

(Continued)

*Primary Examiner* — Chat Do
*Assistant Examiner* — Sergio J Curbelo, III
(74) *Attorney, Agent, or Firm* — IPHORIZONS PLLC; Narendra Reddy Thappeta

(57) ABSTRACT

According to an aspect of the present invention, the dependency information of software components implementing an enterprise application, is used to minimize the down time of the components when applying patches. In an embodiment, all the software components are shut down before applying patches. The patches are then applied and the components are started in a dependency order starting from an independent component. The down time is reduced as a result. According to another aspect, the shutdown also is performed in the reverse of the dependency order. The shutdown and starting are performed using recursive logic.

21 Claims, 9 Drawing Sheets

(56) References Cited

U.S. PATENT DOCUMENTS

| | | | |
|---|---|---|---|
| 2005/0172306 A1* | 8/2005 | Agarwal et al. | 719/328 |
| 2006/0031371 A1* | 2/2006 | Uthe | 709/207 |
| 2006/0048134 A1 | 3/2006 | Napier et al. | |
| 2007/0094491 A1* | 4/2007 | Teo et al. | 713/153 |
| 2007/0106978 A1* | 5/2007 | Felts | 717/124 |
| 2009/0100420 A1* | 4/2009 | Sapuntzakis et al. | 717/171 |
| 2009/0106748 A1* | 4/2009 | Chess et al. | 717/168 |
| 2009/0144720 A1* | 6/2009 | Roush et al. | 717/171 |

OTHER PUBLICATIONS

"Installing Multiple Patches", "Microsoft Corporation", "http://msdn.microsoft.com/en-us/library/aa369529(VS.85).aspx", Downloaded circa: Mar. 2009, p. 1.

"Sequencing Patches", "Microsoft Corporation", "http://msdn.microsoft.com/en-us/library/aa371628(VS.85).aspx", Downloaded circa: Mar. 2009, pp. 1-2.

"Kaseya Patch Management", "Kaseya International Limited", "http://www.kaseya.com/products/patch-management.php", Copyright Date: 2000-2009, p. 1.

"Patchlink Advances Company's Patch Management System to Provide Industry-Leading Enterprise Support; Immediate Availability of Patchlink Update 6 Announced", "http://findarticles.com/p/articles/mi_m0EIN/is_2004_June_29/ai_n6089111", Dated: Jun. 2004, pp. 1-2.

"Ali, S.R.", "Software Patching in the SPC Environment and Its Impact on Switching System Reliability", "http://ieeexplore.ieee.org/iel1/49/2689/00081958.pdf?isnumber=2689&prod=STD&arnumber=81958&arnumber=81958&arSt=626&ared=631&arAuthor=Ali%2C+S.R.", Selected Areas in Communications, IEEE Journal, Dated: May 1991, pp. 626-631, vol. 9, No. 4.

"Use of Cfengine for Automated, Multi-Platform Software and Patch Distribution", "http://portal.acm.org/citation.cfm?id=1045502.1045538&jmp=abstract&coll=Portal&dl=GUIDE&CFID=31584721&CFTOKEN=91919572#abstract", System Administration Conference, Proceedings of the 14th USENIX conference on System administration, Dated: 2000, pp. 207-218.

\* cited by examiner

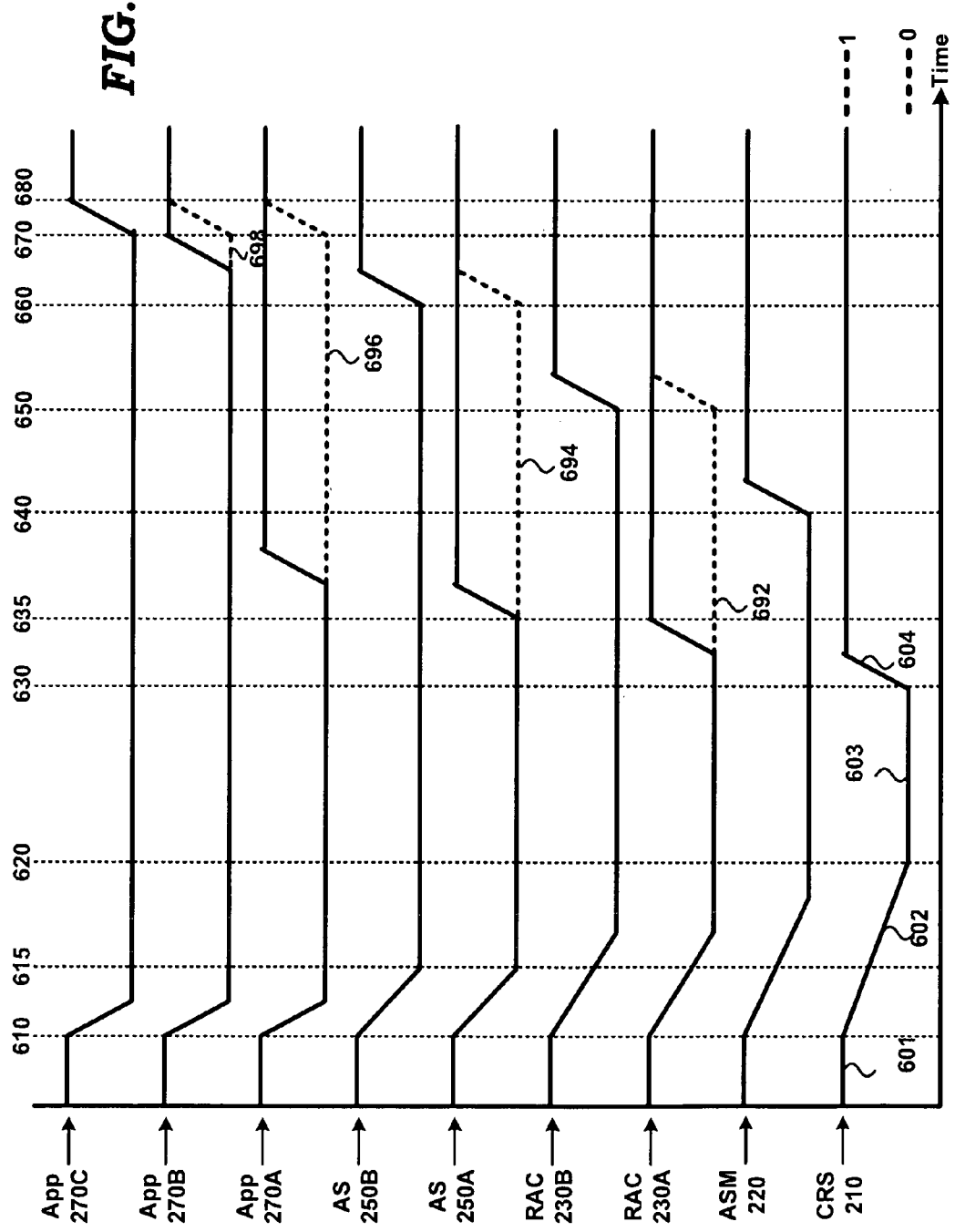

REDUCING DOWNTIME WHEN PATCHING MULTIPLE INTER-DEPENDENT SOFTWARE COMPONENTS

BACKGROUND

1. Technical Field

The present disclosure relates to software maintenance, and more specifically to reducing down time when patching multiple inter-dependent software components.

2. Related Art

Software components refer to applications/software programs, which on execution perform specific tasks. Examples of software components are database management software, operating system, user-defined applications, etc. As is well known, data management software and operating system are characterized as "system software", which is shared by many "user-defined applications" (or user applications).

Multiple software components are often used together to perform more complex tasks. For example, a customer relationship management (CRM) software may be implemented using a set/stack of software components containing multiple user-defined applications, database management software and an operating system cooperatively working together on one or more digital processing systems (connected by a network).

It is generally well known that the execution of a specific component (such as database management software) in a stack may require/use the services/tasks provided by other components in the stack such as an operating system, while being required/used for the execution of another set of components (e.g., user-defined applications) in the stack. Thus, the stack of components are said to be inter-dependent based on such requirements.

There is a general need to provide for patching of such inter-dependent stacks of software components. Patching refers to replacement of desired data/instructions in the software components with corresponding corrected data/instructions (often referred to as patches). The replacements are generally intended to either fix errors or improve the performance of the software components.

Patching of a software component often necessitates the component to be shutdown (placed in non-executing state) before the application of the patches and to be started up (executing state) after the successful application of the patches. As is well known, when in an execution state, at least some of the instructions corresponding to the software component are in random access memory (RAM) type components, ready for execution or being executed by a processor. On the other hand, shutdown implies that the instructions of the software component are no longer executed.

The time duration between the shutdown and startup of a component is often referred to as downtime. It is generally desirable that the downtime of components be reduced. Such a desire is more pertinent in complex systems with many inter-dependent software components since the downtime of a software component affects the downtime and functioning of other dependent components in the stack.

Several aspects of the present invention reduces the downtime of the multiple inter-dependent software components during patching, while meeting one or more of requirements, as suited in the specific environments.

BRIEF DESCRIPTION OF THE DRAWINGS

Example embodiments of the present invention will be described with reference to the accompanying drawings briefly described below.

FIG. 6 is a timing diagram illustrating the reduction of down time in an embodiment of the present invention.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

According to an aspect of the present invention, the dependency information of software components implementing an enterprise application is used to minimize the down time of the components when applying patches. In an embodiment, all the software components are shut down before applying patches. The patches are then applied and the components are started in a dependency order starting from an independent component. The down time is reduced as a result, since each component is started up as soon as the provider (dependent on) components are started.

According to another aspect of the present invention, the shutdown is performed in the reverse of the dependency order noted above. The shutdown and starting are performed using recursive logic.

Several aspects of the invention are described below with reference to examples for illustration. However one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore the features/aspects described can be practiced in various combinations, though only some of the combinations are described herein for conciseness.

2. Example Environment

Figure 1:
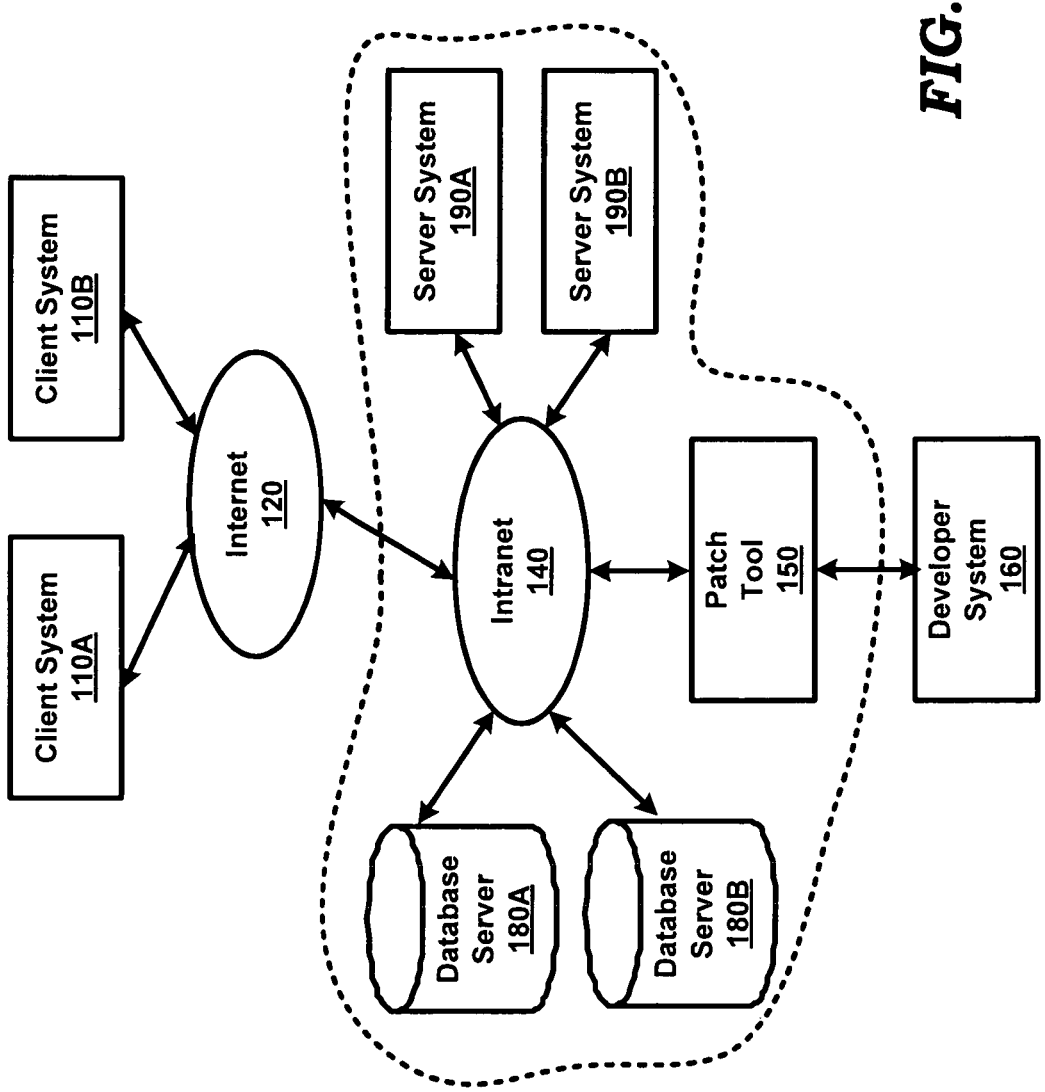
FIG. 1 is a block diagram of an example computing system in which several aspects of the present invention are implemented.

FIG. 1 is a block diagram illustrating an example environment (computing system) in which several aspects of the present invention can be implemented. The block diagram is shown containing client systems 110A-110B, Internet 120, intranet 140, patch tool 150, developer system 160, database servers 180A-180B, and server systems 190A-190B.

Merely for illustration, only representative number/types of systems are shown in the Figure. Many environments often contain many more systems, both in number and type, depending on the purpose for which the environment is designed. Each system/device of FIG. 1 is described below in further detail.

Intranet 140 represents a network providing connectivity between server systems 190A-190B, database servers 180A-180B, and patch tool 150, all provided within an enterprise (shown with dotted boundaries). Internet 120 extends the connectivity of these (and other systems of the enterprise) with external systems such as client systems 110A-110B.

Each of intranet 140 and Internet 120 may be implemented using protocols such as Internet Protocol (IP) well known in the relevant arts. In general, in IP environments, an IP packet is used as a basic unit of transport, with the source address being set to the IP address assigned to the source system from which the packet originates and the destination address set to the IP address of the target system to which the packet is to be eventually delivered.

Each of database servers 180A-180B represents a non-volatile storage facilitating storage and retrieval of a collection of data by one or more (enterprise) applications executing in server systems 190A-190B (typically while processing various client requests) using structured queries. In one embodiment, database servers 180A-180B are implemented using relational database technologies and therefore provides storage and retrieval of data using structured queries such as SQL (Structured Query Language). SQL refers to a special-purpose, generally non-procedural language that supports the definition, manipulation, and control of data in systems implementing relational database technologies.

Each of client systems 110A-110B represents a system such as a personal computer, workstation, mobile station, etc., used by users to generate (client) requests to enterprise applications executing in server systems 190A-190B. The client requests may be generated using appropriate interfaces. In general, a client system requests an enterprise application for performing desired tasks and receives corresponding responses containing the results of performance of the requested tasks.

Each of server systems 190A-190B represents a server, such as a web/application server, which executes enterprise applications capable of performing tasks requested by users using one of client systems 110A-110B. The enterprise applications may perform the tasks on data maintained internally or on external data (for example, stored in database servers 180A-180B) and then send the result of performance of the tasks to the requesting client system.

Each of server systems 190A-190B may also contain other software programs (not shown) such as operating system (for example, UNIX), device drivers (each usually corresponding to a hardware component), virtual machine software (such as JVM available from Sun Microsystems), etc., that provides a (common) run time environment facilitating the execution of the enterprise applications. The execution of enterprise applications may also require the services provided by data drivers, database management software (such as an RDBMS) executing in database server 180A-180B. Thus, the software programs, device/data drivers, etc., and the enterprise applications may be viewed as a stack of inter-dependent software components that work together in processing the client requests.

It may be appreciated that during the performance of tasks by the software components, various errors may be discovered. These errors may include, without limitation, logical errors (due to wrong logic), functional errors (due to the software not performing/functioning as expected), runtime errors (due to problems with the environment in which the software is executed), etc. Such errors (as well as any others detected) may require changes to be made to the software instructions constituting the software components in the enterprise.

Developer system 160 enables developers/users to generate patches to fix various errors in one or more software components. The patches are typically bundled together as a deployment package containing data elements, which replace corresponding data elements in the software components in server systems 190A-190B and/or database servers 180A-180B. The data elements may represent software instructions, data or database schema type definitions, which fix different errors of the executing software components.

Each data element may be provided in the form a file, and thus a deployment package would contain a corresponding number of files. The files may be provided in compressed/archived (".zip") format. A deployment package may also contain software instructions, which on execution (by patch tool 150) causes the desired patches to be deployed. Patch tool 150 receives the deployment package from developer system 160 and then applies the patches contained in the deployment package to the corresponding software components in the enterprise. In general, patch tool 150 is implemented consistent with the format and conventions used in forming patches by developer system 160. Patch tool 150, though shown as an independent system, may be integrated with server systems 190A-190B (or with developer system 160) as will be apparent to one skilled in the relevant arts by reading the disclosure provided herein.

The description is continued describing an example stack of software components followed by the manner of patching of the example stack according to an aspect of the present invention.

3. Example Stack of Software Components

Figure 2:
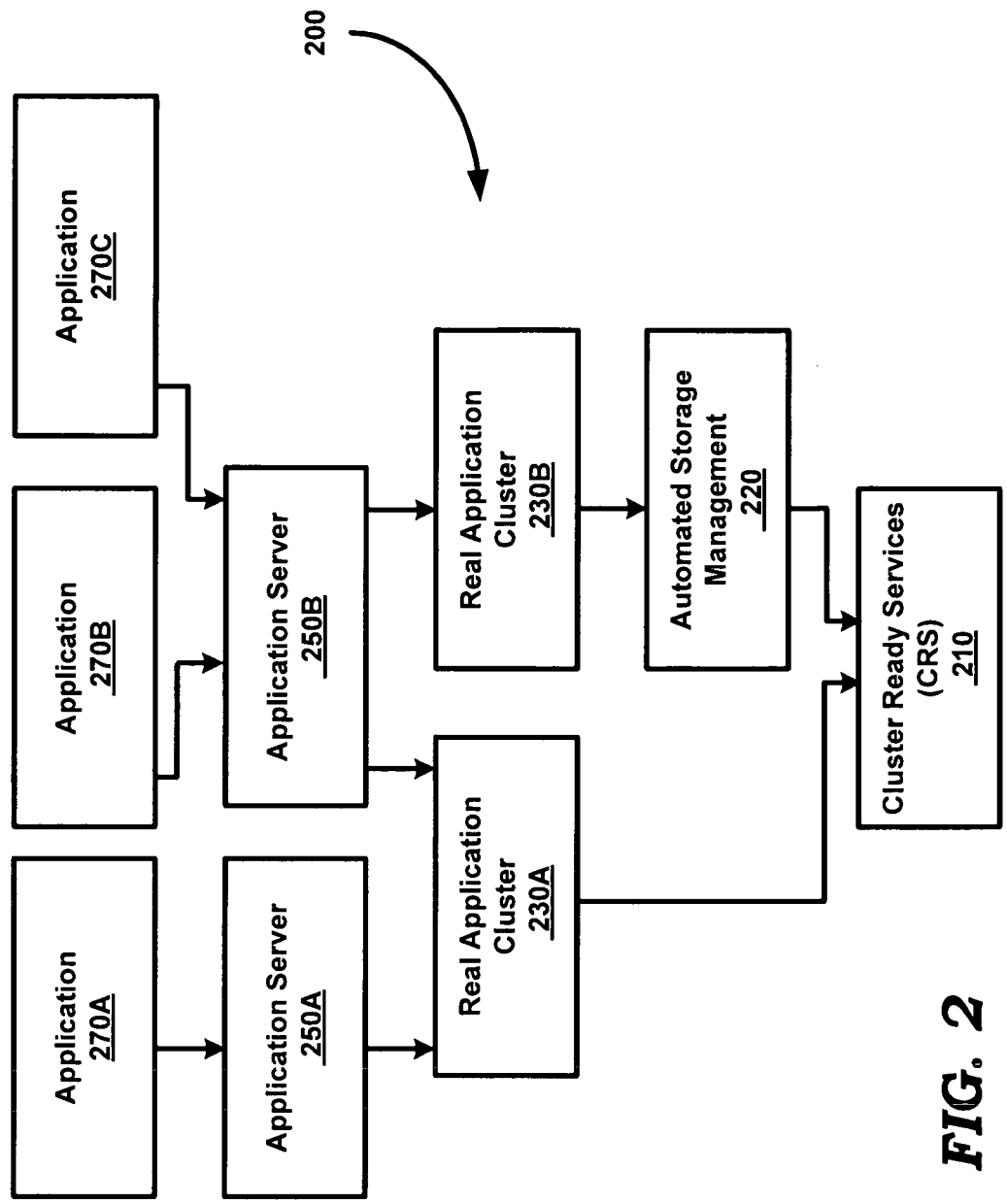
FIG. 2 is a block diagram illustrating the inter-dependency of software components in one embodiment.

FIG. 2 is a block diagram illustrating a stack of software components executing in an enterprise in one embodiment. The block diagram depicts stack 200 containing software components—cluster ready services (CRS) 210, automated storage management (ASM) 220, real application clusters (RAC) 230A-230B, application servers (AS) 250A-250B and applications 270A-270C. Each of the blocks is described in detail below.

It may be noted that only representative number/type of components are shown in stack 200 for illustration. Stacks often contain many more components, both in number and type, depending on the specific requirement/environment. For example, CRS 210 may further depend on a run-time environment such as JVM, and an underlying operating system such as UNIX. Further, the stack of software components in FIG. 2 is assumed to be executing on one or more of server systems 190A-190B. However, the stack may contain other software components executing on database servers 180A-180B, client systems 11A-110B etc. which facilitate execution of the enterprise applications.

Cluster ready services (CRS) 210 represent a software component that allows clustering/grouping of servers/resources for working as a single system. CRS 210 may represent an execution instance of (a portion of) Oracle Clusterware application available from Oracle Corporation, the assignee of the present application.

Automated Storage Management (ASM) 220 simplifies database files management and also provides file system management capabilities directly inside a database. ASM 220 represents a component provided as part of Oracle 10 g database also available from Oracle corporation. ASM 220 may be designed to use some specific services such as cluster synchronization services provided by CRS 210, and accordingly ASM 220 may be viewed as being dependent on CRS 210 (as indicated by the arrow directed from ASM 220 to CRS 210).

Each of real application clusters (RAC) 230A-230B is a database clustering solution that enables multiple software/enterprise applications to connect and access the data in the same database. The RACs may provide the connections using cluster synchronization services provided by CRS 210 and/or may be designed to use the storage services provided by ASM 220 to store and retrieve data. Accordingly, RAC 230A is shown depending on CRS 210 while RAC 230B is shown depending on ASM 220 (which in turn depends on CRS 210).

Each of application servers (AS) 250A-250B provides a run-time environment for execution of enterprise applications. AS 250A-250B may depend on RAC 230A-230B for performing tasks such as establishing a connection to databases, storing/retrieving of data from the connected databases, etc. AS 250A is shown as dependent on RAC 230A, and AS 250B is shown dependent on both RAC 230A-230B.

It may be appreciated that RAC 230A-230B or AS 250A-250B may represent different execution instances of the same software program (executing on the same or different system) or alternatively may represent different software programs that provide similar/same services used by the dependent software components. For example, each of AS 250A-250B may represent different executions instances of Oracle Application Server software available from Oracle Corporation. Alternatively, AS 250A may represent an execution instance of Oracle Application Server software, while AS 250B may represent an execution instance of Websphere Application Server software available from IBM Corporation.

Each of applications 270A-270C represents a user/enterprise application (or instance thereof) designed to provide corresponding functionalities to users (using one of client systems 110A-110B). The applications are often executed in a run-time environment provided by an application server and often use the services provided by the application server for processing client requests. Application 270A is shown dependent on AS 250A and applications 270B-270C are shown dependent on AS 250B.

Thus, the stack of software components described above works together to implement enterprise applications 270-270C processing client requests received from client systems 110A-110B. As described above, errors may be discovered during execution of the software components necessitating the deployment of patches to fix the discovered errors. The deployment of patches may require the software components to be shutdown before the patches are applied and to be started up after the patches are applied.

It may be appreciated that the components in stack 200 are inter-dependent on each other and shutdown or startup of one component may affect the functioning of the other components in the stack. Thus, it may be desirable that a component be shutdown (e.g. RAC 230A) only after shutting down the dependent components (e.g. AS 250A, application 270A) and that the component be started up only after the (successful) start up of the dependent-on or provider components (e.g. CRS 210).

In one prior approach, the stack of software components are viewed as containing layers, with each layer including similar type of components (that provide similar/same services). Thus, stack 200 is viewed as containing layer 1 including CRS 210, layer 2 including ASM 220, layer 3 including RAC 230A-230B, layer 4 including AS 250A-250B and layer 5 including applications 270A-270C. The layers are shutdown in a decreasing order with the components in layer 5 being shutdown first followed by layer 4 components, etc., until the required layer is shut down. The components are started up (after patching) in the increasing order of the layers.

As noted above, it may be desirable that the downtime be reduced when patching multiple inter-dependent software components while overcoming some of the drawbacks of the prior approaches. An aspect of the present invention reduces the downtime of software components by incorporating the dependency information (indicating the inter-dependencies among the software components) in the deployment package containing the patches sought to be applied to the software components as described below with examples.

4. Generating a Deployment Package

Figure 3:
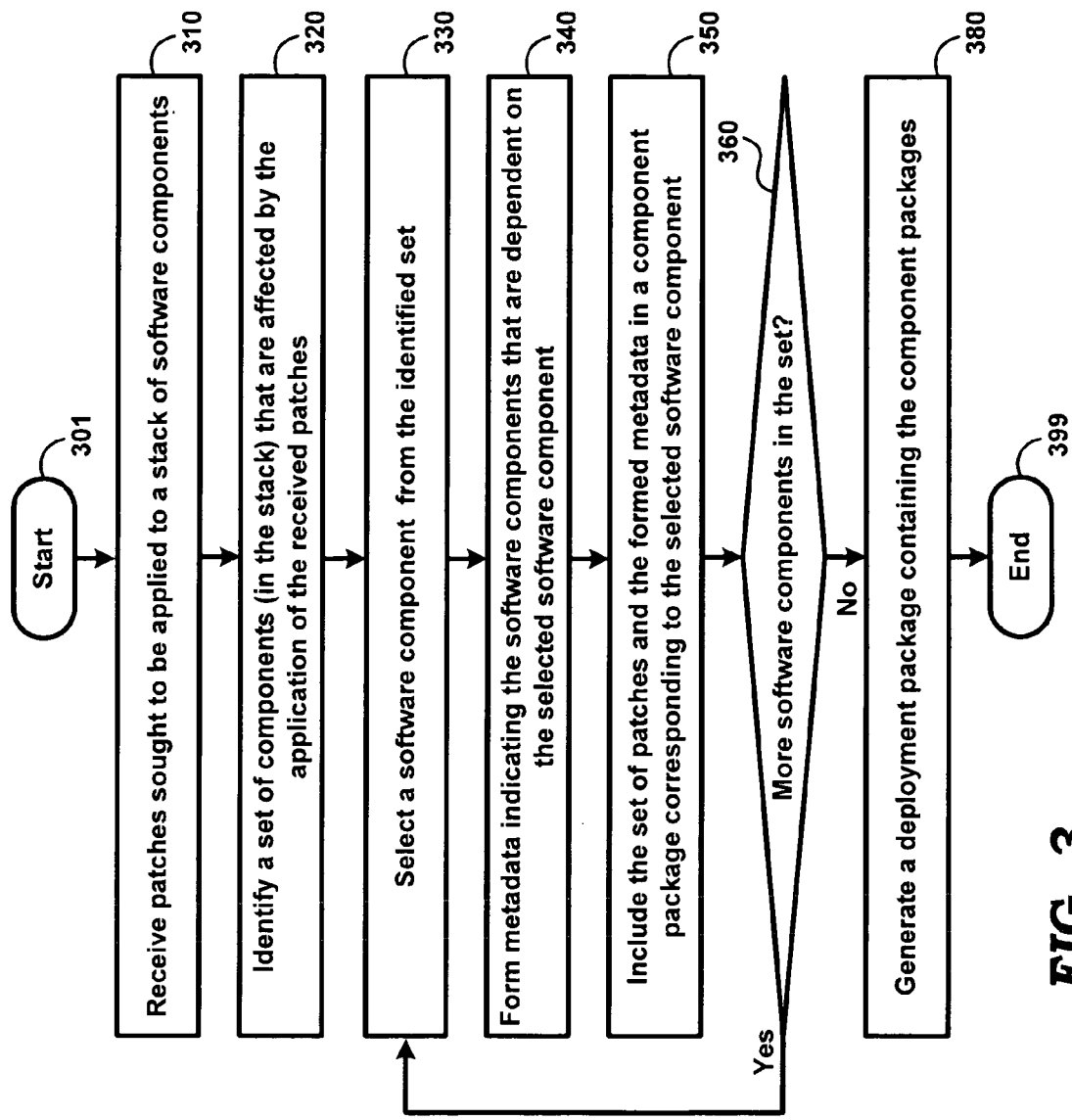
FIG. 3 is a flow chart illustrating the manner in which a deployment package is created in an embodiment of the present invention.

FIG. 3 is a flowchart illustrating the manner in which a deployment package containing patches sought to be applied to a stack of software components is generated according to an aspect of the present invention. The flowchart is described with respect to FIGS. 1 and 2 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention.

The description is continued assuming that the deployment package is generated by patch tool 150. However, the deployment package may be generated by developer system 160 individually or in association with patch tool 150. The flow chart begins in step 301, in which control immediately passes to step 310.

In step 310, patch tool 150 receives patches sought to be applied to a stack of (inter-dependent) software components. The patches may be received from developer system 160 (in a pre-specified format) along with information such as a unique identifier associated with each patch, the software component on which each patch is sought to be applied, the requirements for the application of each patch, etc.

In step 320, patch tool 150 identifies a set of components (in the stack) that are affected (required to be shutdown) by the application of the received patches. The set of components may be identified by including the specific software components in the stack on which the patches are sought to be applied and any other provider/dependent components related to the specific components.

For example, for stack 200 shown in FIG. 2, when patches are sought to be applied to CRS 210, ASM 220, RAC 230B, AS 250B and application 270C, the identified set is determined to include all the components shown in stack 200, since the other components RAC 230A (provider for AS 250B), AS 250A (dependent of RAC 230A), application 270A (dependent of AS 250A), and application 270B (dependent of AS 250B) are required to be shutdown for (affected by) application of the received patches. As another example, assuming patches are sought to be applied only to RAC 230A, the identified set may include only RAC 230A, AS 250A (dependent of RAC 230A) and application 270A.

It may be noted that the identified set may contain software components (such as applications 270A) for which no patches are sought to be applied, and which are included in the set only due to their dependency on one or more patched components.

In step 330, patch tool 150 selects a software component from the identified set. The software components in the identified set may be selected in a known way. For example, in a scenario that the identified set of software components is maintained in the form of a list, the software components may be selected in the same sequence as indicated by the list.

In step 340, patch tool 150 forms metadata indicating the software components that are dependent on (that is, uses the services/tasks provided by) the selected software component. For example, when RAC 230A is selected in step 320, the corresponding metadata formed indicates the dependent software components as AS 250A and AS 250B. In a scenario that the selected software (provider) component or (e.g. application 270A) does not have any dependent components, the corresponding metadata may indicate that there are no dependent components according to a pre-specified convention.

Patch tool 150 may form the metadata after determining the software components dependent on the selected component. The determination (as well as the identification of step 320) may be performed based on a dependency data (indicating the dependencies among the multiple components) provided by a developer/user using developer system 160 and/or one of client systems 110A-110B. Alternatively, the dependency data may be collected by inspecting (e.g., by software based techniques) the manner of execution of the software components in the enterprise. In one embodiment described below, the dependency data is collected and maintained in one of database servers 180A-180B.

In step 350, patch tool 150 includes the set of patches and the formed metadata in a component package corresponding to the selected software component. The component package includes the set of patches (or corresponding identifiers) that are to be applied to the selected software component. In one embodiment, the component package also includes software instructions designed to apply the set of patches based on the included metadata.

Thus, during successive iterations, component packages corresponding to each of the software components in the identified set is created. Each component package indicates the patches to be applied and the metadata corresponding to a software component in the identified set. In one embodiment, the component package is created even when there are no patches to be applied to the corresponding component (for example, application 270A). The component package then merely contains the metadata corresponding to the software component.

In step 360, patch tool 150 checks if there are more software components in the identified set of components for which a corresponding component package is to be created. The checking may be performed consistent with the manner of selection in step 320. For example, when the components are selected in the sequence indicated by a list, the checking may be performed by determining whether the end of list is reached. Control passes to step 330 if there are more components to process (for example, when the end of list is not reached) and to step 380 otherwise.

In step 380, patch tool 150 generates a deployment package containing the component packages (created in step 350) for application to the stack of software components. The deployment package may also contain a package data associating the specific ones of the component packages with the corresponding software component identifier.

The package data may also indicate the independent software components (which are not dependent on other components) in the stack, such as CRS 210. The package data may be used when applying the patches contained the deployment package to the stack of software components. The flow chart ends in step 399.

Thus, a deployment package containing the dependency information about the stack of software components is generated. The deployment package may be maintained in patch tool 150 for later deployment. Alternatively, in a scenario that the steps of FIG. 3 are performed by developer system 160, the generated deployment package may be sent to patch tool 150 for deployment on the stack of software components. The manner in which patches contained in a deployment package are applied to a stack is described below with examples.

5. Applying Patches Contained in a Deployment Package

Figure 4A:
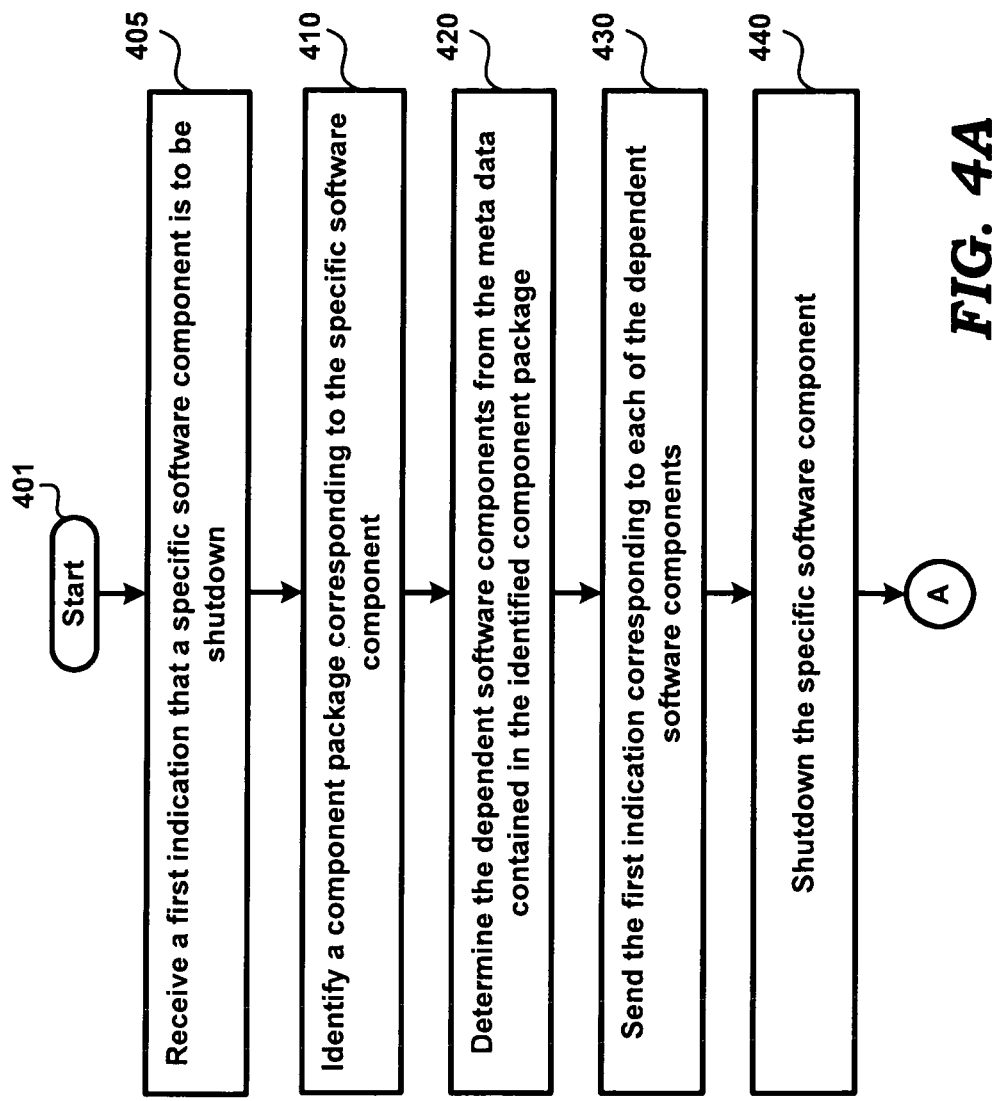
FIGS. 4A and 4B together is a flowchart illustrating the manner in which patches are deployed in an embodiment of the present invention.
Figure 4B:
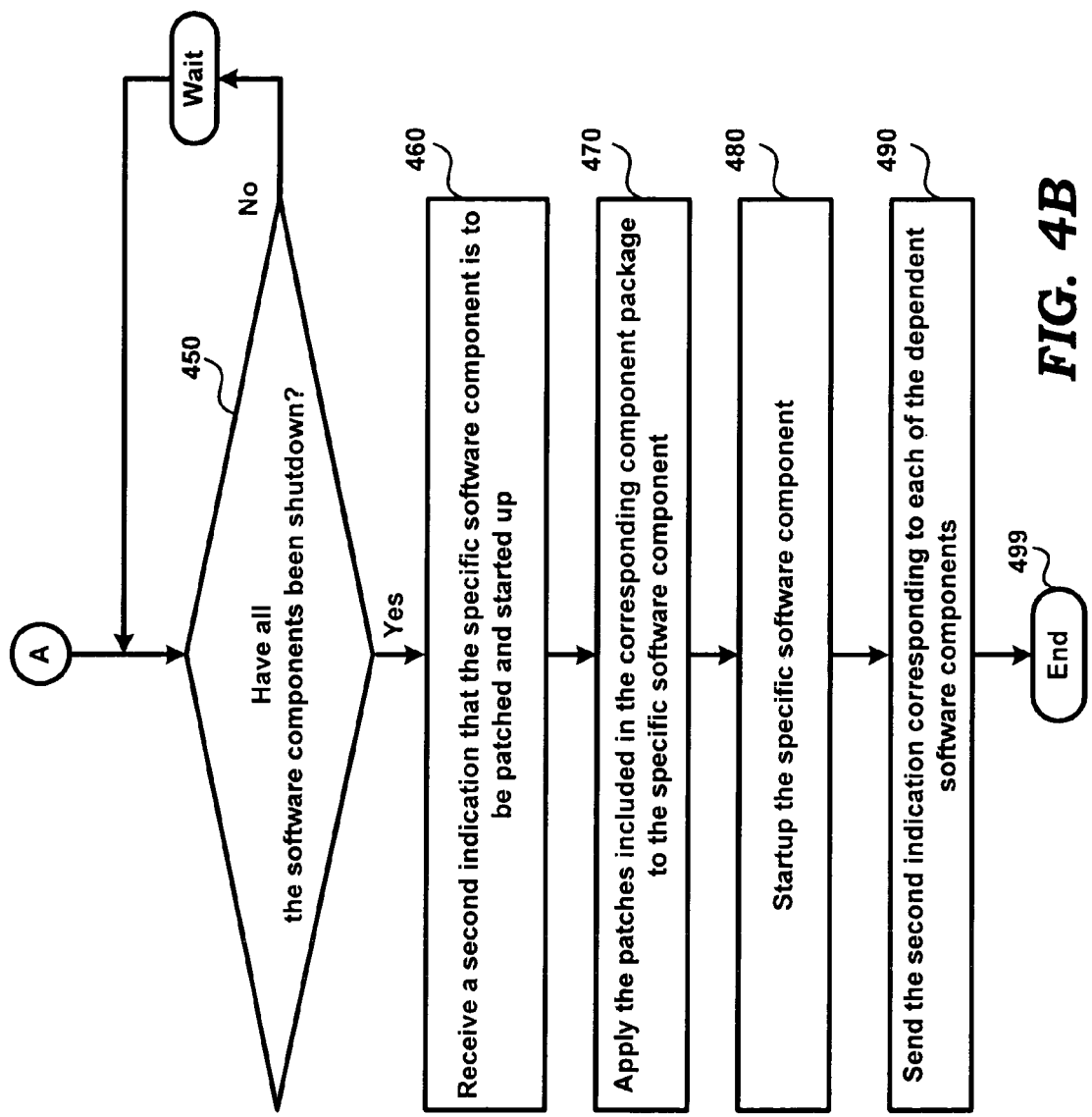

FIGS. 4A and 4B together depict a flowchart illustrating the manner in which patches contained in a deployment package are applied to a stack of software components according to an aspect of the present invention. The flowchart is described with respect to FIGS. 1 and 2 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 401, in which control immediately passes to step 405.

In step 405, patch tool 150 receives a first indication that a specific software component is to be shut down. The first indication may be initially received corresponding to the independent software components (CRS 210) at least based on the package data included in the deployment package (in step 380). Further first indications may be received when processing one of the software components on which the specific software component is dependent on.

In step 410, patch tool 150 identifies a component package corresponding to the specific software component. The identification of the component package may be based on the package data included in the deployment package.

In one embodiment, the component packages are named based on the identifier of the corresponding software component according to a convention. As such, the component package having the name based on the identifier of the specific component package (according to the convention) is identified.

In step 420, patch tool 150 determines the dependent software components from the metadata contained in the identified component package. The determined components are the same components that were determined and included in the metadata by patch tool 150 when creating the component package for the specific software component in steps 340 and 350 of FIG. 3.

In step 430, patch tool 150 sends the first indication corresponding to each of the dependent software components indicating that the dependent components are to be shutdown. In response to sending the first indication, steps 405, 410, 420 and 430 (first set) are performed for each of the dependent software components.

For example, when CRS 210 is processed, the first indication is sent corresponding to the dependent components ASM 220 and RAC 230A. The first set of steps are then performed for ASM 220 and RAC 230A causing the first indication to be sent respectively for RAC 230B and AS 250A-250B. Thus, the first set of steps is recursively invoked by sending/receiving the first indication, thereby causing the first indication to be sent for all the software components in the stack.

In step 440, patch tool 150 shuts down the specific software component (for which the first indication is received). In general, shutting down of the software component makes the component to be in a non-executing state thereby making the services provided by the component unavailable to the dependent components. In one embodiment, the specific software component is shutdown only after all the dependent components have been shutdown successfully.

Thus, the performance of step 440 in response to receiving the first indication ensures that all the software components in the stack are shutdown. It may be appreciated that the sending of the first indication and the shutting down of the software components in the stack may be performed in parallel, further reducing the downtime of the components.

In step 450, patch tool 150 checks whether all the necessary/affected software components (as indicated by the identified set of step 320) have been shutdown. The determination may be performed by inspecting the execution status of each of the software components. Control passes to step 460 if all the necessary/affected software components are determined to be shutdown (that is, are in non-executing state). Otherwise, patch tool 150 waits for a pre-specified period and performs the check of step 450 again.

In step 460, patch tool 150 receives a second indication that the specific software component is to be patched and started up. The second indication may be received similar to the first indication, that is initially corresponding to the independent software components (CRS 210) and then when processing one of the software components on which the specific software component is dependent on.

In step 470, patch tool 150 applies the patches included in the corresponding component package to the specific software component. The corresponding component package may be identified similar to step 410. Alternatively, the patches and metadata contained in the identified component package of step 410 may be maintained in memory for later processing during steps 470 and 490.

Patch tool 150 applies the patches to the specific software component based on the data received along with the patches, which indicates the specific data/instructions that are to be replaced. As noted above, patching entails replacing the software instructions/data with the corresponding instructions/data received in the patch.

In step 480, patch tool 150 performs startup of the specific software component (in response to receiving the second indication), typically after successful patching of the specific software component. In general, starting up of the software component makes the component to be in an executing state (with the instructions forming the software component being executed by a processor) thereby making the services provided by the component to be available to the dependent components.

In step 490, patch tool 150 sends a second indication corresponding to each of the dependent software components (based on the metadata contained in the corresponding component package) indicating that the dependent components are to be patched and started up. In response to sending the second indication, steps 460, 470, 480 and 490 (second set) are performed for each of the dependent software components.

As described above, the second set of steps is recursively invoked by sending/receiving the second indication, thereby ensuring that all the software components are patched using the corresponding patches and stated up. Further, the recursive invocation causes the second indication to be sent for all the software components in the stack.

For example, when CRS 210 is processed, CRS 210 is patched, started up and the second indication is sent corresponding to the dependent components ASM 220 and RAC 230A. The second set of steps are then performed for ASM 220 and RAC 230A causing the components to be patched, started up and the second indication to be sent respectively for RAC 230B and AS 250A-250B. The flow chart ends in step 499.

It may be appreciated that in the prior approach noted above, the downtime of a specific component (e.g., RAC 230A) depends on the layer (3) in which the component is located. Thus, in a scenario where only CRS 210 and ASM 220 are patched, the specific component RAC 230A may be started up only after layers 1 and 2 are started up, though RAC 230A is dependent only on CRS 210 included in layer 1 and could be potentially started up after the patching of CRS 210, thereby reducing the downtime of RAC 230A.

But with the approach of FIG. 4, it may be noted that the components are started (after successful patching if any patches are received) on receiving the second indication thus in the above example RAC 230A may be started without waiting for ASM 220 to complete its patching. In effect, the components are started sooner than in the prior approach of above.

Thus, the applications of the patches based on the formed metadata and generated packages (component/master) contained in the deployment package ensures that the individual downtime of each software component (as well as the overall downtime for the stack, i.e., the duration for which stack is unavailable for processing client requests) is reduced. The manner in which deployment packages for inter-dependent software components are generated in one embodiment is described below with examples.

6. Example of Generating Deployment Packages

Figure 5A:
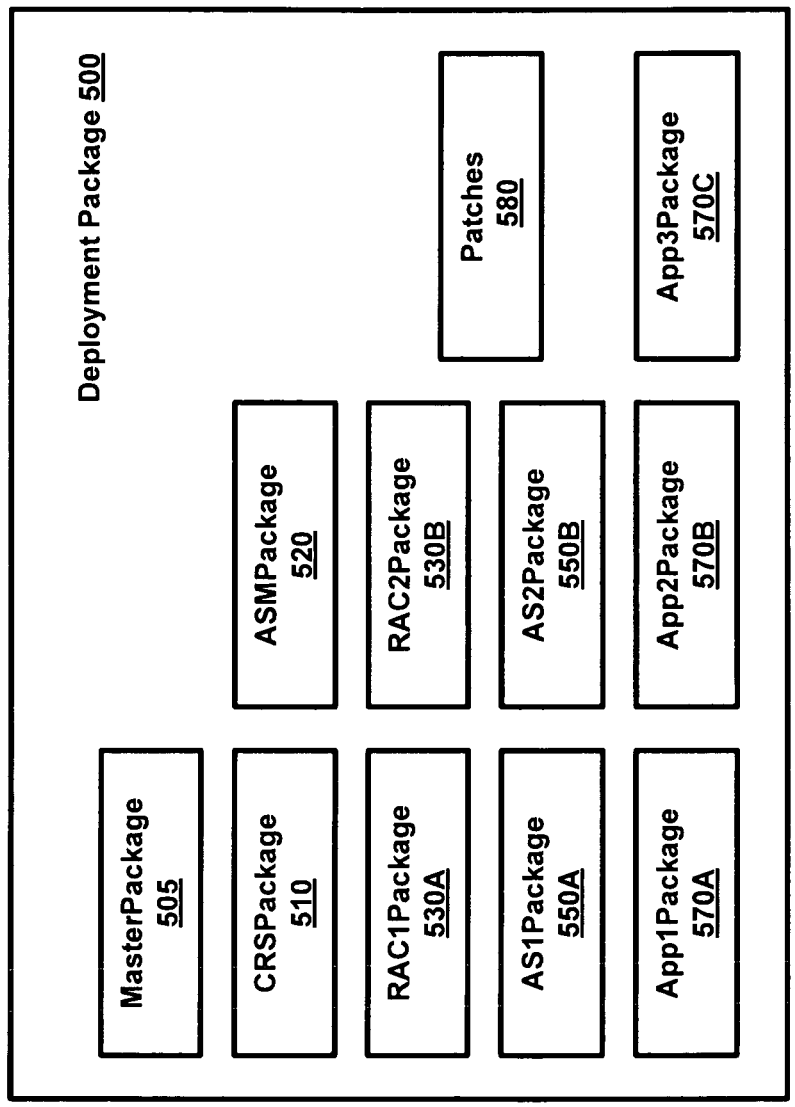
FIG. 5A is a block diagram illustrating the details of a deployment package in an embodiment.

FIG. 5A is a block diagram depicting the generated deployment package for patching multiple interdependent software components in one embodiment. The Figure is used to illustrate the manner in which patch tool 150 forms a deployment package for patching multiple inter-dependent software components stack 200.

Deployment package 500 is shown as containing the MasterPackage 505 (containing the data of independent software components in the stack, such as CRS 210), component packages CRSPackage 510 (corresponding to CRS 210), ASMPackage 520 (corresponding to ASM 220), RAC1Package 530A (corresponding to RAC 230A), RAC2 Pacakge 530B (corresponding to RAC 230B), AS1Package 550A (corresponding to AS 250A), AS2 Package 550B (corresponding to AS 250B), App1Package 570A (corresponding to Application 270A), App2Package 570B (corresponding to Application 270B), and App3Package 570C (corresponding to Application 270C) corresponding to each of the components in stack 200 and patches 580.

Patch tool 150 receives the patches 580 sought to be applied on the inter-dependent software components shown in the stack 200. It may be appreciated that the number of patches received for each of the software components in the stack 200 may be zero or more. Each patch may be indicated by an identifier (which may be a specific number or combination of numbers and letters etc) and may indicate the software component on which it has to be applied in one embodiment.

Patch tool 150 first identifies a set of software components that are affected by application of the received patches. The description is continued assuming that the identified set (based on the patches received) contains all the software components of stack 200, and accordingly, the word "stack" is used to both represent stack 200 and the identified set of components. However, the below description is applicable when the identified set is merely a subset of the software components of stack 200.

Patch tool 150 selects the software components from the stack 200 in a known way and forms a metadata. The metadata formed by the patch tool 150 for each of the software component in stack 200 includes a list of dependent components in one embodiment. Alternatively the list may contain the component packages names corresponding to each of the dependent components.

For example, the components dependent on CRS 210 are ASM 220 and RAC 230A. The metadata formed by the patch tool 150 for CRS 210 will include the package names such as "ASMPackage" and "RAC1Package" in one embodiment. Alternately the CRS package may just indicate the dependent components "ASM" and "RAC1". Some/part of deployment logic in the component package for CRS 210 is shown below as an example.

It may be appreciated that though the applicable software code is shown below in terms of pseudo-code similar to Java programming language, several embodiments of present invention can be implemented using other languages and for other formats, without departing from the scope and spirit of the present invention, as will be apparent to one skilled in the relevant arts by reading the disclosure provided herein. It may also be appreciated that the names of the variables/functions are chosen to closely describe the utility provided by the corresponding variables/functions.

Accordingly, the deployment logic in the component package for CRS 210 may be as follows:

```
Class CRSPackage {
    List DependentComponentPackages = {ASMPackage,
    RAC1Package};
    List PatchList = { "1002", "1004"};
}
```

Wherein class ("class" is a JAVA programming language construct well known in relevant arts) name "CRSPackage" shows that it represents a component package for CRS 210.

The variable "DependentComponetPackages" is the metadata listing the components (alternately component package names) dependent on the component which the package (CRS 210) represents. For example, "DependentComponentPackages" indicates the package names corresponding to the dependent components ASM 220 (ASMPackage) and RAC 230A (RAC1Package) for CRS210 in CRSPackage as shown above. It should be noted that only a reference (such as the package name or a pointer) to the dependent components are maintained in variable "DependentComponentPackages", and the inclusion of the reference does not indicate that the dependent package is contained in the component package.

The variable "PatchList" lists the patches (or a reference to the patches in the form of corresponding identifiers) to be applied on the component which the package (CRS 210) represents. For example, CRSPackage contains patch identifiers 1002, 1004 in the variable "PatchList" thus representing the patches to be applied on CRS 210. It may be noted that the patch identifiers 1002 and 1004 represents corresponding individual patches forming part of patches 580 in deployment package 500 in one embodiment.

It may be appreciated that the patch tool 150 constructs the "DependentComponentPackages" list for each of the component in stack 200 using the input received from the developer system 160 either along with the patches or as user inputs (such as from key board, etc.) in one example. In another embodiment, patch tool 150 stores the dependency data among the software components in the stack 200 either in a secondary storage or in the database servers 180A-180B as a list and may retrieve the stored data to construct the "DependentComponentPackages" (formed metadata) for each of the component in the stack 200. Accordingly the component packages in the deployment package are formed by the patch tool 150.

It may also be appreciated that each of the packages (except for master package) in the deployment package 500 may contain code (part of deployment logic) similar to the one explained above for CRSPackage 510 corresponding to CRS 210. The metadata (dependent component list) "DependentComponentPackages" and the "PatchList" correspond to the software component that each package represents. For example RAC1Pacakge (corresponding to RAC 230A) contains "AS1package" and "AS2 Package" as metadata (dependent component list) and may contain no patch identifiers in PatchList as patch tool 150 may not have received any patches for RAC 230A as an example.

As shown in FIG. 5A deployment package may contain a MasterPackage, which contains metadata indicating the independent components (alternately component packages). It may be noted that the MasterPackage does not correspond to any of the specific software components in the stack (200) of inter-dependent software components. It merely indicates the list of independent software components (alternately component packages) in a stack of inter-dependent software components.

For example, CRS 210 in the set of inter-dependent software components 200 is considered as an independent component as it does not depend on the services of any other component. Accordingly the MasterPackage 505 will have metadata as "CRSPackage" (the package corresponding to CRS 210). The MasterPackage deployment logic (part of it) is shown below:

```
Class MasterPackage {
    List DependentComponentPackages = { CRSPackage };
}
```

Wherein the class name depicts the package it represents, which is MasterPackage. The list (metadata) "DependentComponentPackages" lists CRSPackage, which corresponds to CRS 210 (independent component).

It may be noted that the constructs of a stack of multiple inter-dependent components may show one or more independent components even though the example in FIG. 2 has only one independent software component. Accordingly the MasterPackage lists all the component package names corresponding to each of the independent components as metadata in the master package. It may also be noted that there will not be any patch list in the MasterPackage, as it does not correspond to a particular software component.

Figure 5B:
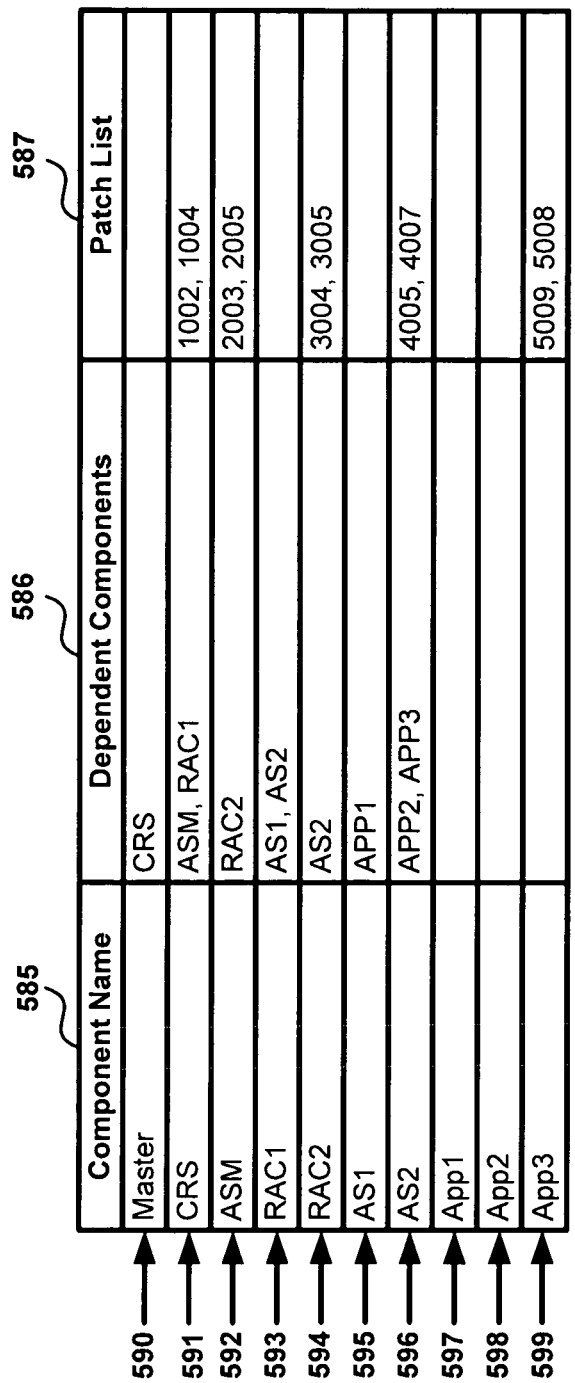
FIG. 5B is table illustrating the dependency information in an embodiment.

FIG. 5B is a table representing the metadata and patchlist for patching multiple interdependent software components in an alternate embodiment. The table depicts the set of data (part of) generated by patch tool 150 based on which the patches may be deployed in the software components in stack 200 in an embodiment. Broadly, table 5B depicts the components 585, dependent components 586 (metadata) of the corresponding component in 585 and patch list 587 corresponding to each of the software components in the stack in one embodiment.

It may be noted that the list contains the independent components (line 590) in an embodiment. The metadata 586 and the Patch List 587 on each line 591, 592, 593, 594, 595, 596, 597, 598, 599 corresponds to the software components CRS 210, ASM 220, RAC 230A, RAC 230B, AS 250A, AS 250B, App 270A, App 270B, App 270C respectively. The metadata 586 in line 590 represents the independent components in stack 200 and the patch list is indicated with no patches as the independent component does not correspond to any one of the components in the stack it is merely used to list the components that are not dependent on the services of any other component in the stack.

It may be observed that the patch list (column 587) for the components RAC 230A (RAC1) in line 593, AS 250A (AS1) in line 595, App 270A (App1) in line 597, App 270B (App2) in line 598 have no identifiers listed thus indicating that zero number of patches received for these components in this example. Further the lines 597 (App1) representing App 270A, 598 (App2) representing App 270B and 599 (App3) representing App 270C shows no components listed in the dependent list (586) thus indicating there are no components dependent on the services of App 270A, App270B and App 270C. It may also be observed that the component AS 250A (AS2) is listed on both the lines 593 and 594 in the dependent list (586) column thus indicating AS 250A is dependent on the services of both RAC 250A and RAC 250B.

It may be appreciated that patch tool 150 may be merely generating the dependency data shown in the table of FIG. 5B in a suitable format and use the data to deploy the received patches on the components in the stack 200 instead of including the same information in deployment packages. In the alternative, as described below in further detail, the portions of the content of FIG. 5B may be listed as metadata in the corresponding component packages in the deployment package 500.

Accordingly patch tool 150 forms the data and may generate component packages for the application of the patches received from developer system 160 in stack 200. The metadata (dependency list) formed by patch tool 150 is to assist in the reduction of downtime when applying the patches to the stack 200 thus by overcoming at least some of the drawbacks of the prior approach explained above.

Various aspects of deployment of the patches for reducing downtime when patching multiple inter dependent software components is described below in detail.

7. Deployment of Patches

The deployment of packages begins with the MasterPackage in one embodiment. The MasterPackage contains the list of package names (metadata) corresponding to the independent components and accordingly the deployment of patches may begin with the independent components. Typically deployment of patches to a specific software component involves the shutdown of specific software component, application of the patches (if any) to specific software component and then startup of the patched specific software component.

It may be further noted that all the components receive shutdown and later patch and startup indication using a recursive approach (which is well known in relevant arts). Using recursive approach to send such indications to all the selected components in the stack ensures the shutdown and startup (after patching) of all the components in the stack happen appropriately/accordingly.

Typically shutdown of a component may involve connecting (may be by using a username and password) to the specific software component, and then performing an optional backup of the software instructions/data of the specific software component and then issuing the corresponding stop/shutdown (command) according to the environment in which the specific software component is used thus to bring the component to the non-executing state.

In a stack of multiple inter-dependent software components, the shutdown of a specific software component may affect the components dependent on the services of specific software component as the process of shutdown makes the component unavailable (non-executing state) for use. Accordingly it may be required to shut down all the dependent components before the shut down of specific software component. It may be necessary that a particular order be followed while shutting down the components when there is dependency between the components for performing required tasks.

The MasterPackage (505) contains information indicating independent components, and each of the component packages (such as 510) contains information indicating dependent components. The component packages may contain shutdown instructions for the component (corresponding to the package it represents) in one embodiment. The order in which the components are shutdown depends on the inter-dependency between the components in the stack and is performed using the metadata formed.

The instructions (deployment logic) using the recursive approach for shutdown of a component and the order of shutdown of the components in stack 200 based on the metadata formed by patch tool 150 in an embodiment is explained below in detail.

The MasterPackage may contain the following pseudo code/deployment logic (similar to Java programming language) in one example. Only the relevant portions are shown here for conciseness:

```
Class MasterPackage {
    List DependentComponentPackages = { CRSPackage };
    patch( ) {
        foreachInParallel item in DependentComponentPackages {
            item.shutdown( )
        }
    }
}
```

Wherein the "patch( )" represents a function/method when invoked/called/executed performs a set of instructions identified between the open curly bracket "{" and the corresponding close curly bracket "}" as is well known in the relevant arts.

Deployment of patches can begin by calling/executing the method "patch( )" in the MasterPackage in one embodiment. Indications are sent in parallel (foreachInParallel) that all the components listed in the variable "DependentComponentPackages" are to be shutdown.

Patch tool 150 identifies the component packages corresponding to the received indication for shut down among the packages in the deployment package 500 (may be using the package data included in the deployment package 500). For example in stack 200 indication is received that CRS 210 is to be shutdown and "CRSPackage" 510 (corresponding to CRS 210) is identified from deployment package 500 as the package corresponding to CRS 210 by patch tool 150.

Deployment logic (part of it) in identified CRSPackage is shown below in one embodiment. The code/instructions in "MasterPackage" (patch( )) on execution indicates that CRS 210 is to be shutdown using the shutdown ( ) function in CRSPackage:

```
Class CRSPackage {
    List DependentComponentPackages = {ASMPackage, RAC1Package};
    shutdown( ) {
        foreachInParallel child in DependentComponentPackages {
            child.shutdown( );
        }
```

-continued

```
    shutMeDown( );
  }
}
``` wherein on receiving the shutdown indication, further indications for shutdown to the dependent components is sent in parallel (foreachInParallel) by parsing the list variable "DependentComponentPackages" (dependency metadata formed by patch tool 150) to ensure that all the dependent components are to shutdown before CRS 210 is shutdown (shutMeDown( )).

In the above example, when an indication is received for the shutdown of the components ASM 220 and RAC 230A (dependents of CRS 210), the packages ASMPackage 520 and RAC1Package 530A are identified as the corresponding packages for ASM 220 and RAC 230A respectively.

Accordingly shutdown part of the code/instructions in ASMPackage and RAC1Package is executed in parallel (that is around the same time). It may be appreciated that the instruction "foreachinParallel" creates two indications/requests to be sent (one for the shutdown of the component ASM and another one for RAC1) at the same time in the above example. It may also be appreciated "foreachinParallel" instruction can create any number (one or more) of requests at the same time depending upon the number of dependent components in the "DependentComponentPackages" list, thus reducing downtime to a certain extent.

It may be appreciated (as explained above) the indications sent and received is repeated (recursively) till a software component which does not have any dependents is reached (for example 270A in FIG. 2) thus performing "shutMeDown( )" instruction on the software components (shown in the example code as part of the component package). Subsequent "shutMeDown( )" instructions are performed once a component's dependents are successfully shutdown. For example once Application 270B and 270C are successfully shutdown, component 250B is shutdown (based on the "shutMeDown( )" instructions in the AS2 Package 550B) thus using the recursive approach.

It may be noted that each of the identified component packages may contain instructions/code (deployment logic shown above) similar to the CRSPackage. It may be further noted that to avoid any errors during or due to shutdown of a software component a check is performed to make sure all the components dependent on the (if any) specific software component is shutdown successfully before performing the shutdown of the specific software component in one embodiment. The check may be required as a software component may have more than one component dependent on it. For example AS 250B has Application 270B and Application 270C dependent on it and both the components should be shut down successfully before AS 250B is shutdown.

It may also be required to perform an additional check to see if a software component is already in the shutdown state. A component may be dependent on multiple components (for example AS 250B is dependent on RAC 230A and RAC 230B) and multiple indications for shutdown may be sent and received. In a scenario where multiple indications for shutdown are received, later received indications may be ignored in an embodiment or a message may be sent that the component is already in the shut down state or is in the process of being shut down (if the component is already shutdown) in response to an earlier indication.

It may be noted that as the indications are sent in parallel (as shown above) for the shut down of the dependent components, the shutdown indications may also be received around the same time. For example the dependent components Application 270B and Application 270C may receive the indication for shutdown (from AS 250B) around the same time and may reach the shutdown state around the same time. Accordingly in one embodiment the order of shutdown of the components in stack 200 is 270A, 270B and 270C followed by 250A and 250B reaching the shutdown state, which is followed by 230A and 230B to the shut down state which in turn will be followed by 220 and 210 reaching the shutdown state following 220.

In another embodiment the shutdown may be a serial operation where the indications are sent one after the other for each of the dependent component and the dependent components may shutdown one after other and the provider component will wait for a successful shutdown from all the child components before shutting down.

Further a check is performed to ensure all the necessary/affected components in the stack (such as 200) are in the shutdown state (non-executing) before the patches (580) are applied on the software components in stack (200). The application of the patches begins with the MasterPackage in one embodiment.

After shutdown of all the components successfully, the patches may be applied on the software components for which the patches are received. Each component can be started up (executing state) after the successful application of patches (or can be started up without applying the patches when no patches are received for the component after all the components on which the specific software component is dependent on have been started up successfully), thus making it available for the dependent components and the clients (such as 110A, 110B) for sending requests and receiving responses.

Typically startup of a component may involve connecting (may be by using a username and password) to the specific software component, then issuing the corresponding startup (command) according to the environment in which the specific software component will be executing after ensuring patching has been performed successfully.

The MasterPackage has the information (as software instructions in one embodiment) which indicates for the patching and startup of the independent components (such as CRS 210) in the stack (such as 200) and each of the component packages has the information/instructions to perform patching and startup of the corresponding component and contains information to indicate for the patching and startup of its dependent components after being successfully patched and started up. The instructions that perform patching and startup based on the inter-dependencies using the formed metadata in a recursive approach for reducing downtime is explained below in detail.

The MasterPackage will contain the following deployment logic in one example (again shown as pseudo code similar to Java programming language):

```
Class MasterPackage {
    List DependentComponentPackages = { CRSPackage };
    patch( ) {
        foreachInParallel item in DependentComponentPackages {
            item.shutdown( );
            item.patchAndStartup ( );
        }
    }
}
```

As explained above after the successful shutdown (item.shutdown( )) of all the components in the stack 200 an indication is sent that all the independent software components are to be patched and started up (item.patchstartup( ) code in MasterPackage). An indication is sent in parallel (foreachInParallel) that all the components corresponding to the component packages listed in the variable "DependentComponentPackages" are to be patched and started up by indicating to the method (item.patchAndStartup( )).

On receiving the indication, patch tool 150 identifies (from the deployment package 500) a component package corresponding to the component for which the indication was received. For example in stack 200, MasterPackage indicates CRS 210 (independent component) is to be patched and started up and patch tool 150 identifies the corresponding package CRSPackage 510 from deployment package 500 as the package corresponding to CRS 210.

Alternately the identified package name may be stored in a secondary storage (not shown) when the same identification was performed while shutting down the component. For further description below, it is assumed that the package names are already identified.

Deployment logic (part of it) that may be part of each of the component package (such as CRSPackage) is shown below. The code in "MasterPackage" on execution indicates (by invoking patchAndStartup( )) patch and startup of CRS 210 as follows:

```
Class CRSPackage {
    List DependentComponentPackages = {ASMPackage, RAC1Package};
    List PatchList = {"1002", "1004"};
    shutdown( ) {
        foreachInParallel child in DependentComponentPackages {
            child.shutdown( );
        }
        shutMeDown( );
    }
    patchAndStartup( ) {
        patchMeAndStartup( );
        foreachinParallel child in DependentComponentPackages {
            child.patchAndStartup ( );
        }
    }
}
``` wherein the instructions within the function "shutdown( )" is explained above as part of the shutdown of the components, and function "patchAndStartup" is explained below with reference to patching and start up of the components in stack 200.

Thus, upon receiving the indication to patch and startup by invocation of the function "patchAndStartup( )", the patches included in the PatchList (1002, 1004) are retrieved from the patches 580 and the patches are applied on CRS 210, followed by starting up of the component CRS 210 ("patchMeAndStartup( )").

After the component is started up successfully, further indications are sent in parallel (foreachInParallel) to all the dependent components (list in the variable "DependentComponentPackages") that all the dependent components are to be patched and started up (indicated by the method child.patchAndStartup( )).

It may be appreciated that the patches (such as 1002, 1004) itself may contain other metadata required for the application of the patches in the software component on which it is applied. Patching may involve performing backup of the specific data/instructions that are to be replaced, replacing the data/instructions with the corresponding data/instructions in the received patch for the specific software component, verifying to make sure that the patch has been applied successfully and an optional restore when the verification fails, as is well known in the relevant arts. It may also be appreciated that after starting up the components checks may be performed to ensure that the patches have been applied without any errors as is well known in relevant arts.

In stack 200, the indication is received for the patch and start up of components 220 and 230A (dependent on 210), the patches 2003, 2005 (Line 592, Patch List in FIG. 5B) are applied on the software component 220 followed by the start up of the component whereas the component 230A will be started up immediately as there are no patches to be applied to the component (Patch List 587 in line 593 of FIG. 5B).

After the component 220 has been started up successfully an indication is sent for patch and start up of its dependent component 230B. The patches 3004, 3005 (Line 594, Patch List in FIG. 5B) are applied on the software component 230B followed by the start up of the component. Further indications are sent for patch and start up of components 250B, which is dependent on 230B. The patches 4005 and 4007 (Line 596, Patch List in FIG. 5B) are applied on the software component 250B followed by the start up of the component. Indications are sent for patch and start up of 250B's dependents 270B and 270C. Component 270B does not have any patches (Line 598 Patch List in FIG. 5B) and started up on received indication. Patches 5009 and 5008 (Line 599, Patch List in FIG. 5B) are applied on the software component 270C and the component is started up.

Similarly after start up of 230A, indications are sent for patch and startup of its dependents 250A and 250B. Component 250A does not have any patches (Line 595, Patch List in FIG. 5B) and so the software component is started up on receiving the indication. AS2 (230B) has patches to apply, before the application of patches it may check and see if all the components it is dependent on have been patched and started up successfully in one embodiment (250B is dependent on components 230A and 230B). On successful startup of 250A an indication is sent to 270A for patch and startup and it is started up on receiving the indication, as there are no patches to apply on the component (Line 597, Patch List in FIG. 5B)

It may be appreciated that it may be necessary to verify if all the components that a specific component is dependent on have been started up successfully before the application of the patches (especially when a component is multi dependent). For example component 250B is dependent on the services of both 230A and 230B.

Accordingly the software components in the stack 200 is patched and started up and the order of startup is CRS 210, RAC 230A, AS 250A, Application 270A, ASM 220, RAC 230B, AS 250B, Application 270B, Application 270C in the above example. It may be appreciated that the components that do not have patches to be applied are started up on receiving the indication for startup instead of waiting for the components in the higher layers to start up in contrast to the prior approach (for example RAC 230A is started up before ASM 220) thus reducing downtime. It may also be appreciated that by sending the indications in parallel for the dependent components further may reduce the downtime.

All the above noted reasons may decrease the downtime (the time period during which the component is not available for the users/dependent components for sending requests and receiving corresponding responses) to a certain extent for at least some of the components in stack 200. Such a reduction in downtime is further illustrated using a timing diagram.

8. Timing Diagram

FIG. 6 represents a timing diagram depicting reduction in down time when patching multiple inter-dependent software components. Specifically FIG. 6 corresponds to the timing diagram for patching a stack of software components 200 represented in FIG. 2.

In particular, the level indicated as 1 depicts the time during which the corresponding software component is in executing state (for example at portion 601). The level indicated as 0 depicts the level during which the component is in the shut down state (for example at portion 603). The line going down from the point where the component is available to the point component reaches the shut down state is the time during which the component is in the process of shutdown (for example 602).

The line, which goes up from the shutdown state of the component to the executing state of the component is the time during which the component is in startup process (for example line 604). Downtime of a component is the time interval between shutdown and the startup of the component. For example downtime of RAC 230A is the time duration between the points 610 and 635.

The description below is continued with the assumption that the time interval between sending an indication for shut down and receiving the same for a specific software component is negligible. Similarly the time interval between sending a patch and start up indication and receiving the same for a specific software component is negligible.

According to FIG. 6, at 610 all the software components are in the executing state. At 610, an indication is received for shutdown of CRS 210 and further indications are sent for shutdown of its dependent components 220 and 230A. Subsequent indications are sent based on the received indications and the inter-dependency between the components. At 610, all the components in stack 200 have received the indication for shutdown and the process of shutting down has begun. The process of shutting down components 270C, 270B, and 270C is completed, followed by the components 250B and 250A, followed by 230A and 230B, followed by 220 and followed by 210.

It may be appreciated that a check may be performed before shutting down a component to make sure that all of its dependent components have been successfully shut down, the time taken to perform this check is also assumed negligible and so not represented in FIG. 6.

At 615, the components 270C, 270B, 270A, 250B and 250A have completed shutdown process while the components 230B, 230A, 220 and 210 are in the process of shutdown. At 620, all the components in stack 200 have been successfully shutdown (non executing state).

At 620, an indication is received for the patch and startup of 210. At 630, component 210 is patched and process of start up begins. Once the startup of the component 210 is complete, the indication for the patch and startup of dependent components of 210 (220 and 230A) are sent. At 635, when 220 is in the process of being patched 230A has completed the process of startup as there are no patches to be applied to 230A (layer 3) even though it is one layer below ASM 220 (layer 2) thus reducing downtime of 230A to an extent. It may be observed that both 220 and 230A received the indication for patch and start up around the same time after the successful startup of 210 (indication sent and received in parallel)

At 635, after completion of the start up process of component 230A an indication (for patch and startup) of its dependent components 250A and 250B is sent. Component completes the startup process, as there are no patches to be applied to the component. Component 250B (multi dependent on both 230A and 230B) waits for the patching and start up of the component 230B on which it is dependent. On completion of startup of 250A an indication for patch and startup of 270A (dependent component of 250A) is sent which completes the process of starting up, as there are no patches received for 270A.

At 640, the components 210, 230A, 250A and 270A are available for performing tasks (executing state) even though they are all in different layers and there are components in the layers above them, which have not been started yet (such as 230B). Also at 640, component 220 completes patching and begins the process of start up. On completion of the startup process of 220 an indication is sent for 230B (dependent on 220) for patching and startup. 230B completes the process of patching at 650 and begins the start up process. On completion of the startup process of 230B an indication (for patch and start up) is sent to its dependent component 250B, patching of 250B ends at 660. At 660, the process of startup begins for 250B, on completion of the process an indication is sent for the components (270B and 270C) dependent on 250B for patch and startup.

Component 270B, starts up (completes starting up at 670) on receiving the indication from 250B, where as 270C starts patching and completes start up at 680. At 680 all the components in the stack 200 are started up thus being back in the executing state.

It may be noted that the beginning of the start up process for each of the component in the prior approach (layer based) shown as dotted lines. As per the prior approach (layer based) the component 230A would have started the process of starting up only at 650 instead of completing start up at 635 thus saving a time duration marked by 692 in FIG. 6. Similarly the components 250A saved time duration shown by 694, 270A saved a time duration shown by 696 and 270B saved time duration shown by 698 thus reducing down time of at least some of the components in the stack 200 for the above described embodiment.

It should be further appreciated that the above-described features may be implemented in a combination of one or more of hardware, software and firmware. The description is continued with respect to an embodiment in which various features are operative by execution of corresponding software instructions.

9. Digital Processing System

Figure 7:
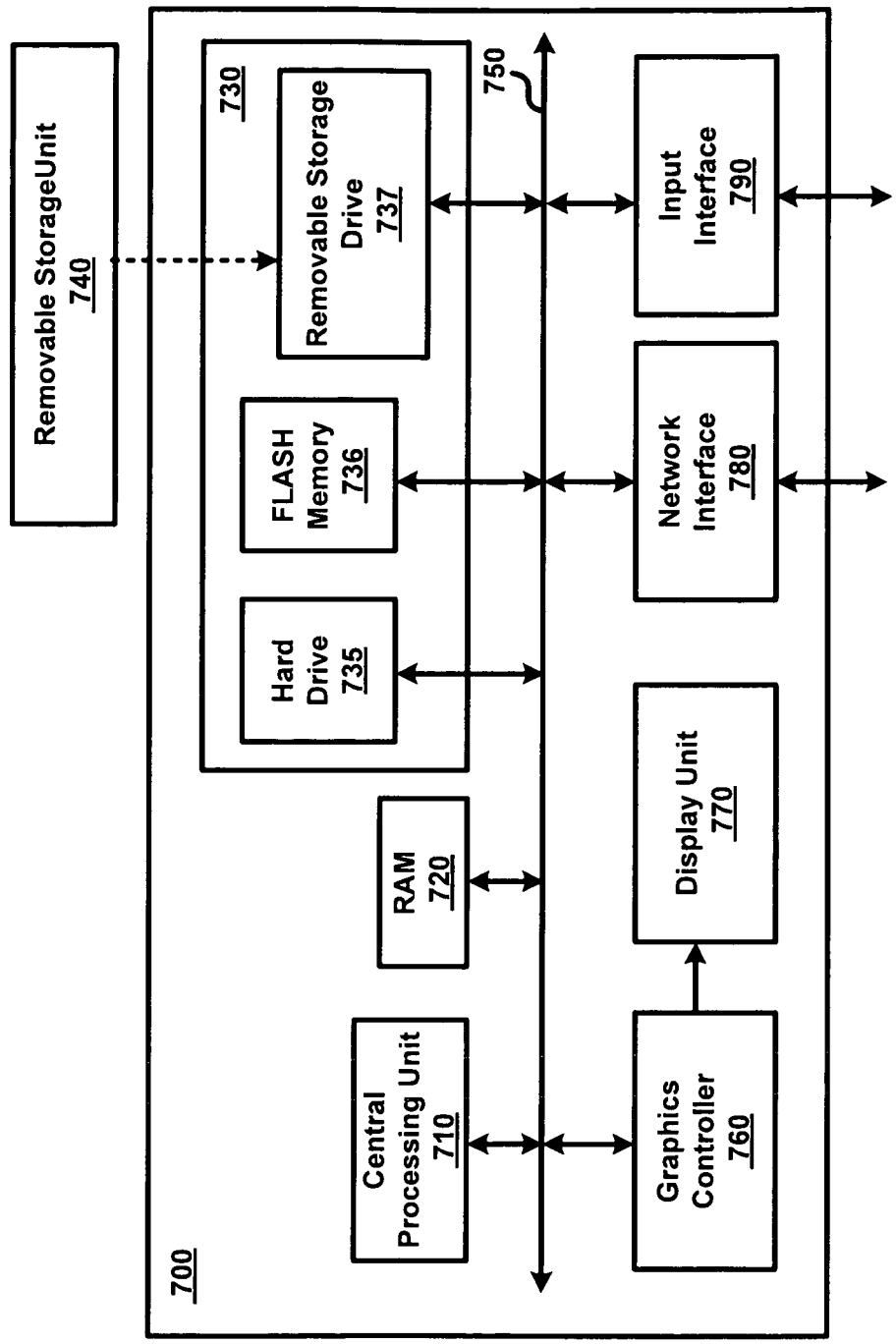
FIG. 7 is a block diagram illustrating the details of an example environment in which several features of the invention are operative upon execution of appropriate software instructions.

FIG. 7 is a block diagram illustrating the details of digital processing system 700 in which various aspects of the present invention are operative by execution of appropriate software instructions. Digital processing system 700 may correspond to any system (such as server systems 190A-190B) implementing the patch tool and developer system 160.

Digital processing system 700 may contain one or more processors such as a central processing unit (CPU) 710, random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present invention. CPU 710 may contain multiple processing units, with each processing unit potentially being designed for a specific task. Alternatively, CPU 710 may contain only a single general-purpose processing unit. RAM 720 may receive instructions from secondary memory 730 using communication path 750.

Graphics controller 760 generates display signals (e.g., in RGB format) to display unit 770 based on data/instructions received from CPU 710. Display unit 770 contains a display screen to display the images defined by the display signals.

Input interface 790 may correspond to a keyboard and a pointing device (e.g., touch-pad, mouse) and may be used to provide inputs.

Network interface 780 provides connectivity to a network (e.g., using Internet Protocol), and may be used to communicate with other connected systems (such as client systems 110A-110B, database server 180) of FIG. 1.

Secondary memory 730 may contain hard drive 735, flash memory 736, and removable storage drive 737. Secondary memory 730 may store the data (e.g., the dependency information of FIG. 5B, the software patches 580, deployment package 500) and software instructions (e.g., those implementing the flowcharts and the pseudo-codes described above), which enable digital processing system 700 to provide several features in accordance with the present invention.

Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

10. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computing system comprising:

a set of systems to store a plurality of software components implementing an enterprise application containing a plurality of layers, wherein software components in each layer are designed to provide services to software components in higher layers while using services provided by software components in lower layers, wherein said plurality of software components are inter-dependent on each other according to a dependency order, wherein a first software component is dependent on a second software component, which in turn is dependent on a third software component according to said dependency order, a fourth software component is also dependent on said third software component without being dependent on said second software component, wherein said first software component and said fourth software component are present in a third layer, said second software component is present in a second layer and said third software component is present in a first layer, wherein said third layer is higher than said second layer, which in turn is higher than said first layer in said plurality of layers, wherein each software component in the same layer provides same services to components in higher layers such that both of said first software component and said fourth software component in said third layer provide same services to software components in a fourth layer which is higher than said third layer in said plurality of layers, wherein said first software component, said second software component, said fourth software component and said third software component are contained in said plurality of software components;

a developer system to send a plurality of patches sought to be applied to said plurality of software components, wherein said plurality of patches includes respective patches for said first software component, said second software component and said third software component;

and a patch tool to apply said plurality of patches on respective software components after all of said plurality of software components, including said first software component, said second software component, said third software component and said fourth software component are in a shutdown state, said patch tool to start up said plurality of software components in said dependency order starting first with an independent component, wherein said independent component is contained in said plurality of software components, wherein said patch tool starts up each component after completion of patching of the component and after starting up of a set of components on which the component is dependent upon, without waiting for patching of all of said plurality of software components, wherein each software component continues to be in executing state after being started up until all of said plurality of software components are also started up, wherein services provided by the software component in the executing state are available to corresponding components in higher layers, wherein said third software component is started up at a third time instance after completion of patching of said third software component, but without waiting for completion of patching of said second software component and said first software component in view of said second layer being higher than said first layer, wherein said second software component is started up at a second time instance after completion of patching of said second software component, but without waiting for completion of patching of said first software component in view of said third layer being higher than said second layer, wherein said first software component is started up at a first time instance after completion of patching of said first software component and said starting up of said second software component, wherein said fourth software component in said third layer is started up at a fourth time instance after completion of patching of said fourth software component and said starting up of said third software component in said first layer, but without waiting for said starting up of said second component in said second layer in view of said fourth software component not being dependent on said second software component, wherein said first time instance is after said second time instance, which in turn is after said third time instance, and wherein said fourth time instance is after said third time instance but before said second time instance, wherein at least one of said set of systems, said developer system and said patch tool comprising a processor executing instructions retrieved from a memory.

2. The computing system of claim 1, wherein said dependency order is represented by a dependency data, wherein said patch tool examines said dependency data to determine said dependency order.

3. The computing system of claim 2, wherein said dependency data comprises a plurality of metadata, each metadata being included associated with a respective component, the metadata associated with a component indicating a set of components which are dependent on the component, each of said plurality of software components being associated with a corresponding one of a plurality of deployment logics, said patch tool being operable to first send a shutdown command to the deployment logic associated with said independent component, wherein the deployment logic of each of said plurality of software components, including said independent component, is designed to send a shutdown request to the deployment logics of dependent components indicated by corresponding one of said plurality of metadata and is designed to shutdown the associated software component after receiving an indication that corresponding dependent components are shutdown, whereby shutdown happens in a reverse dependency order ending with said independent component, said patch tool being operable to then send a patch and startup command to the deployment logic associated with said independent component, wherein the deployment logic of each of said plurality of software components, including said independent component, is designed to first apply to applicable ones of said plurality of patches to the associated software component, then startup the associated software component and then send another indication to the deployment logics of the dependent components according to the associated metadata, whereby said plurality of software components are started in said dependency order starting with said independent component.

4. The computing system of claim 3, wherein said indications for shutdown of the dependent components of a component are sent in parallel.

5. The computing system of claim 4, wherein said indications for patch and startup of the dependent components of a component are also sent in parallel.

6. The computing system of claim 2, wherein said dependency data is formed in said patch tool.

7. The computing system of claim 2, wherein said dependency data is formed in said developer system and sent to said patch tool along with said plurality of patches in the form a deployment package.

8. The computing system of claim 1, wherein said plurality of software components comprise a database system, a cluster ready service, an automated storage management and an application server software.

9. The computing system of claim 1, wherein said first software component and said fourth software component are different execution instances of a same software program providing same services to software components in said fourth layer, wherein said fourth layer contains a fifth software component which is dependent on said fourth software component, without being dependent on said first software component, wherein said fifth software component is started up after said starting up of said fourth software component, but without waiting for said starting up of said first software component.

10. A method of applying patches to a plurality of software components implementing an enterprise application containing a plurality of layers, wherein software components in each layer are designed to provide services to software components in higher layers while using services provided by software components in lower layers, said plurality of software components including a first software component, a second software component, a third software component and a fourth software component, wherein said first software component and said fourth software component are present in a third layer, said second software component is present in an second layer and said third software component is present in a first layer, wherein said third layer is higher than said second layer, which in turn is higher than said first layer in said plurality of layers, wherein each software component in the same layer provides same services to components in higher layers such that both of said first software component and said fourth software component in said third layer provide same services to software components in a fourth layer which is higher than said third layer in said plurality of layers, said method comprising:

receiving a dependency data associated with a plurality of patches sought to be applied on said plurality of software components, said dependency data indicating inter-dependencies among said plurality of software components, wherein said plurality of patches includes respective patches for said first software component, said second software component and said third software component;

shutting down said plurality of software components, including said first software component, said second software component, said third software component and said fourth software component, executing on a set of systems;

examining said dependency data to determine a dependency order among said plurality of software components, wherein said dependency order indicates, for each component, a corresponding set of components that are dependent on the component, wherein said dependency order indicates that said first software component is dependent on said second software component, that said second software component is in turn dependent on said third software component, and that a fourth software component is also dependent on said third software component without being dependent on said second software component;

applying said plurality of patches to said plurality of software components;

and starting said plurality of software components in said dependency order starting with an independent component comprised in said plurality of software components, wherein said starting starts up each component after completion of patching of the component and after starting up of a set of components on which the component is dependent upon, without waiting for patching of all of said plurality of software components, wherein said third software component is started up at a third time instance after completion of patching of said third software component, but without waiting for completion of patching of said second software component and said first software component in view of said second layer being higher than said first layer, wherein said second software component is started up at a second time instance after completion of patching of said second software component, but without waiting for completion of patching of said first software component in view of said third layer being higher than said second layer, wherein said first software component is started up at a first time instance after completion of patching of said first software component and said starting up of said second software component, wherein said fourth software component in said third layer is started up at a fourth time instance after completion of patching of said fourth software component and starting up of said third software component in said first layer, but without waiting for said starting up of said second component in said second layer in view of said fourth software component not being dependent on said second software component, wherein said first time instance is after said second time instance, which in turn is after said third time instance, and wherein said fourth time instance is after said third time instance but before said second time instance.

11. The method of claim 10, wherein said plurality of software components are also shutdown in said dependency order determined based on said dependency data.

12. The method of claim 11, wherein said shutting down and starting are performed using a recursive logic implemented associated with each of said plurality of software components.

13. The method of claim 12, wherein said dependency data comprises a plurality of metadata, each metadata being included associated with a respective component, the metadata associated with a component indicating a set of components which are dependent on the component, each of said plurality of software components being associated with a corresponding one of a plurality of deployment logics, said method comprising:

sending a shutdown command to the deployment logic associated with said independent component, wherein the deployment logic of each of said plurality of software components, including said independent component, is designed to send a shutdown request to the deployment logics of dependent components indicated by corresponding one of said plurality of metadata and is designed to shutdown the associated software component after receiving an indication that corresponding dependent components are shutdown, whereby shutdown happens in a reverse dependency order ending with said independent component, and sending a patch and startup command to the deployment logic associated with said independent component after completion of shutdown of all of said plurality of software components, wherein the deployment logic of each of said plurality of software components, including said independent component, is designed to first apply to applicable ones of said plurality of patches to the associated software component, then startup the associated software component and then send another indication to the deployment logics of the dependent components according to the associated metadata, whereby said plurality of software components are started in said dependency order starting with said independent component.

14. The method of claim 13, wherein said indications for shutdown of the dependent components of a component are sent in parallel.

15. The method of claim 13, wherein said indications for patch and startup of the dependent components of a component are also sent in parallel.

16. The method of claim 10, wherein said first software component and said fourth software component are different execution instances of a same software program providing same services to software components in said fourth layer, wherein said fourth layer contains a fifth software component which is dependent on said fourth software component, without being dependent on said first software component, wherein said fifth software component is started up after said starting up of said fourth software component, but without waiting for said starting up of said first software component.

17. A non-transitory machine readable medium storing one or more sequences of instructions for causing a system to facilitate applying of patches to a plurality of software components implementing an enterprise application containing a plurality of layers, wherein software components in each layer are designed to provide services to software components in higher layers while using services provided by software components in lower layers, wherein said plurality of software components are inter-dependent on each other according to a dependency order, wherein a first software component is dependent on a second software component, which in turn is dependent on a third software component according to said dependency order, a fourth software component is also dependent on said third software component without being dependent on said second software component, wherein said first software component and said fourth software component are present in a third layer, said second software component is present in a second layer and said third software component is present in a first layer, wherein said third layer is higher than said second layer, which in turn is higher than said first layer in said plurality of layers, wherein each software component in the same layer provides same services to components in higher layers such that both of said first software component and said fourth software component in said third layer provide same services to software components in a fourth layer which is higher than said third layer in said plurality of layers, wherein execution of said one or more sequences of instructions by one or more processors contained in said system causes said system to perform the actions of:

receiving a dependency data associated with a plurality of patches sought to be applied on said plurality of software components, said dependency data indicating inter-dependencies among said plurality of software components, wherein said plurality of patches includes respective patches for said first software component, said second software component and said third software component;

shutting down said plurality of software components, including said first software component, said second software component, said third software component and said fourth software component, executing on a set of systems;

examining said dependency data to determine a dependency order among said plurality of software components, wherein said dependency order indicates, for each component, a corresponding set of components that are dependent on the component, wherein said dependency order indicates that said first software component is dependent on said second software component, that said second software component is in turn dependent on said third software component, and that a fourth software component is also dependent on said third software component without being dependent on said second software component;

applying said plurality of patches to said plurality of software components;

and starting said plurality of software components in said dependency order starting with an independent component comprised in said plurality of software components, wherein said starting starts up each component after completion of patching of the component and after starting up of a set of components on which the component is dependent upon, without waiting for patching of all of said plurality of software components, wherein said third software component is started up at a third time instance after completion of patching of said third software component, but without waiting for completion of patching of said second software component and said first software component in view of said second layer being higher than said first layer, wherein said second software component is started up at a second time instance after completion of patching of said second software component, but without waiting for completion of patching of said first software component in view of said third layer being higher than said second layer, wherein said first software component is started up at a first time instance after completion of patching of said first software component and said starting up of said second software component, wherein said fourth software component in said third layer is started up at a fourth time instance after completion of patching of said fourth software component and starting up of said third software component in said first layer, but without waiting for said starting up of said second component in said second layer in view of said fourth software component not being dependent on said second software component, wherein said first time instance is after said second time instance, which in turn is after said third time instance, and wherein said fourth time instance is after said third time instance but before said second time instance.

18. The non-transitory machine readable medium of claim 17, wherein said plurality of software components are also shutdown in said dependency order determined based on said dependency data.

19. The non-transitory machine readable medium of claim 18, wherein said shutting down and starting are performed using a recursive logic implemented associated with each of said plurality of software components.

20. The non-transitory machine readable medium of claim 19, wherein said dependency data comprises a plurality of metadata, each metadata being included associated with a respective component, the metadata associated with a component indicating a set of components which are dependent on the component, each of said plurality of software components being associated with a corresponding one of a plurality of deployment logics, said sequence of instructions further for:

sending a shutdown command to the deployment logic associated with said independent component, wherein the deployment logic of each of said plurality of software components, including said independent component, is designed to send a shutdown request to the deployment logics of dependent components indicated by corresponding one of said plurality of metadata and is designed to shutdown the associated software component after receiving an indication that corresponding dependent components are shutdown, whereby shutdown happens in a reverse dependency order ending with said independent component, and sending a patch and startup command to the deployment logic associated with said independent component after completion of shutdown of all of said plurality of software components, wherein the deployment logic of each of said plurality of software components, including said independent component, is designed to first apply to applicable ones of said plurality of patches to the associated software component, then startup the associated software component and then send another indication to the deployment logics of the dependent components according to the associated metadata, whereby said plurality of software components are started in said dependency order starting with said independent component.

21. The non-transitory machine readable medium of claim 17, wherein said first software component and said fourth software component are different execution instances of a same software program providing same services to software components in said fourth layer, wherein said fourth layer contains a fifth software component which is dependent on said fourth software component, without being dependent on said first software component, wherein said fifth software component is started up after said starting up of said fourth software component, but without waiting for said starting up of said first software component.

* * * * *